United States Patent [19]

Sinha

[11] Patent Number: 5,256,198
[45] Date of Patent: Oct. 26, 1993

[54] USE OF POLYMER/NITRATE COMPOSITIONS TO INCREASE THE POROSITY OF FLY ASH IN BAG HOUSE OPERATIONS

[75] Inventor: Rabindra K. Sinha, Coraopolis, Pa.

[73] Assignee: Calgon Corporation, Pittsburgh, Pa.

[21] Appl. No.: 960,048

[22] Filed: Oct. 13, 1992

[51] Int. Cl.$^5$ .............................................. C04B 18/06
[52] U.S. Cl. ............................... 106/708; 106/DIG. 1; 264/DIG. 49
[58] Field of Search ................. 106/705, 708, DIG. 1; 264/DIG. 49; 252/500

[56] References Cited

U.S. PATENT DOCUMENTS 4,439,351  3/1984  Sinha .................................. 252/500

OTHER PUBLICATIONS

Sinha, "A New Chemical Conditioner Together with a Special Feed System Keep Plants on Emission Compliance at Low Treatment Costs", Mar. 28-31, 1988.
Sinha, "A New Chemical Conditioner Together with Good Operations and Maintenance Program Management Helps Meet Emissions Objectives", Feb. 1986.
Calgon Bulletin, FACT-3000 (Mar. 1989).
Calgon Bulletin, FACT-5000 (Mar. 1989).

Primary Examiner—Karl Group
Assistant Examiner—Paul Marcantoni
Attorney, Agent, or Firm—W. C. Mitchell; C. M. Caruso

[57] ABSTRACT

A method for increasing the porosity of fly ash comprising adding an effective amount of a polymer/nitrate composition to fly ash produced from the combustion of fuels such as coal.

7 Claims, No Drawings

# USE OF POLYMER/NITRATE COMPOSITIONS TO INCREASE THE POROSITY OF FLY ASH IN BAG HOUSE OPERATIONS

BACKGROUND OF THE DISCLOSURE

Fly ash results from the burning of fuel. Utilities and industries which burn fuel for energy and power generation are oftentimes required to meet strict emission compliance standards for the discharge of fly ash entrained in flue gases. Most of the fly ash entrained in a typical gas is separated by either a mechanical means, such as a cyclone or a bag filter, or through the use of an electrostatic precipitator (ESP). This invention relates to the modification of fly ash porosity in systems which utilize bag houses to separate fly ash from flue gas streams, thereby reducing the energy required to operate and maintain bag house operations.

The inventor has found that the application of various polymer/nitrate compositions into a fly-ash laden gas stream upstream of a bag house increases fly ash porosity, thereby improving the efficiency of bag house operations used to separate dust (fly ash) from flue gas streams. Thus, fly ash solids which are difficult to collect and separate are made more amenable to collection in the bag house.

Currently, the only technique available to keep bag replacement and power costs to a minimum is to balance filter strength and filter permeability. There are two parameters that affect power consumption: the permeability of the filter material and the permeability of the dust cake collected on it. When the pressure drop across the dust cake and the filter exceeds a designated maximum, the bags are mechanically cleaned either by shaking, reverse air flow or reverse pulse air-flow. High frequency of cleaning increases wear and tear whereas operation at too high a pressure drop increases power costs. Treatment of the fly ash with the compositions of this invention helps reduce the energy required to operate and maintain filter bags used in manufacturing and power generating industries.

Conventional technology is to increase the porosity of fly ash by feeding large levels (e.g., about 25 ppm or more) of sulfur trioxide and ammonia into flue gas streams. This requires handling two hazardous, corrosive and potentially toxic gases to achieve results.

Instead of handling two different chemicals ($SO_3$ & $NH_3$), the instant process generally only requires the handling of one product, which is a non-toxic, safe and easy to handle aqueous composition. Another advantage is that the formulations described herein can be applied by using simple and low cost feed systems.

U.S. Pat. No. 4,439,351 to Sinha discloses the use of either cationic or anionic polymers to lower the electrical resistivity of fly ash. Copending application U.S. Ser. No. 531,826 is directed to the use of anionic polymer/ammonium nitrate/sodium nitrate compositions to lower the electrical resistivity of fly ash. Sinha, "A New Chemical Conditioner Together with Good Operations and Maintenance Program Management Helps Meet Emissions Objectives" (February 1986), discloses the use of a polymer/ammonium nitrate solution, commercially available from Calgon as FACT 3000, to treat fly ash. The same author, in "A New Chemical Conditioner Together with a Special Feed System Keep Plants on Emission Compliance at Low Treatment Costs" (March 1988), discloses the use of FACT 5000 to treat fly ash in a coal-fired boiler. FACT 5000 is an anionic polymer/sodium nitrate/ammonium nitrate blend available from Calgon Corporation.

None of these references disclose or suggest the use of the instant compositions to increase the porosity of fly ash.

DETAILED DESCRIPTION OF THE INVENTION

The instant invention is directed to a method for increasing the porosity of fly ash prior to treatment of the fly ash in a bag house comprising adding an effective amount for the purpose of a composition comprising: a) at least about 0.1%, by weight, based on total composition weight, of an anionic or a cationic polymer; b) at least about 1.0%, by weight, based on total composition weight, of at least one nitrate; and c) and balance water.

While compositions containing anionic polymers and ammonium nitrate, with or without sodium nitrate, are known in the art, such compositions have not been used to increase the porosity of fly ash in bag house operations. This application is not believed to be known or suggested in the art.

Treatment of fly ash produced from burning a solid fuel such as coal with the formulations described herein increases the porosity of the treated ash. The instant formulations are preferably applied as fine mists to the ash-laden hot flue gas, upstream of bag filters.

Anionic polymers are generally preferred in the instant compositions, particularly when low sulfur fuels are burned. It is believed that virtually any anionic polymer may be used as component a). Examples include, but are not limited to, polymers of any unsaturated carboxylic acid, or salt thereof. As examples of such anionic polymers, there may be mentioned: polymers of acrylic acid, methacrylic acid, alpha-halo-acrylic acid, maleic acid or anhydride, itaconic acid, vinyl acetic acid, allylacetic acid, fumaric acid, $\beta$-carboxyethyl acrylate and crotonic acid, alone or in combination, and salts thereof. Also suitable are polymers of acrylic acid and/or methacrylic acid with other polymerizable unsaturated water-soluble monomers, including but not limited to, polyethylene glycol mono methacrylate, 2-hydroxypropyl acrylate, vinyl sulfonic acid, vinyl phosphonic acid, vinyl acetate, ethyl vinyl ether, acrylamide, ethyl acrylate, ethyl methacrylate, methacrylamide, 2-acrylamido-2-methylpropyl sulfonic acid, 2-methacrylamido-2-methylpropyl sulfonic acid, styrene sulfonic acid., sulfoalkyl acrylate, sulfoalkyl methacrylate, allyl sulfonic acid, methallyl sulfonic acid, and 3-methacrylamido-2-hydroxypropyl sulfonic acid, alone or in combination, their salts and mixtures thereof. Also included in this class of polymers are those polymers of acrylamide which are partially hydrolyzed. Blends of anionic polymers can also be used.

Preferred anionic polymers are selected from the group consisting of homopolymers of acrylic acid or methacrylic acid, hydrolyzed polyacrylamides, homopolymers of maleic acid or anhydride, sulfonated polystyrenes and polymers containing from about 1-99%, by weight, of: i) acrylamide, acrylic acid or methacrylic acid; and ii) from about 99-1%, by weight, 2-hydroxypropyl acrylate, a sulfonated styrene, 2-acrylamido-2-methylpropyl sulfonic acid or 2-methacrylamido-2-methylpropyl sulfonic acid, alone or in combination, and salts of these polymers.

More preferred anionic polymers for use as component a) in the instant method are selected from the group of polymers comprising:
(i) an unsaturated monomer selected from the group consisting of acrylic acid, methacrylic acid, salts of acrylic acid or methacrylic acid, and acrylamide, alone or in combination; and
(ii) an unsaturated sulfonic acid selected from the group consisting of 2-acrylamido-2-methylpropyl sulfonic acid, 2-methacrylamido-2-methyl propyl sulfonic acid and salts or combination thereof; wherein the weight ratio of (i):(ii) ranges from about 20:1 to about 1:20, preferably about 10:1 to about 1:10.

The most preferred anionic polymers for use as component a) in the instant method are copolymers of acrylamide and 2-acrylamido-2-methylpropyl sulfonic acid or 2-methacrylamido-2-methylpropyl sulfonic acid and salts thereof, wherein the monomer weight ratios range from about 10:1 to about 1:10.

The molecular weight of the anionic polymer used should be in excess of about 100,000, preferably in excess of about 500,000 and most preferably in excess of about 1,000,000.

While anionic polymers are generally preferred because of the prevalence of high sulfur coals, the use of cationic polymers is preferred when coal containing in excess of about 3.0% (by weight) sulfur is burned. It is believed that virtually any cationic polymer may be used. Examples include polyamines and polymers prepared from the following monomers: dialkyldiallyl ammonium halide, ethyleneamine, methacrylamidopropyl triethyl ammonium halide, 2-methacryloyloxyethyl trimethyl halide chloride, 2-methacryloyloxyethyl trimethyl ammonium methosulfate and diquaternary ionene, alone or in combination. The above monomers can also be polymerized with nonionic monomers such as acrylamide. Preferred cationic polymers are selected from the group consisting of water-soluble polyamines and water-soluble dialkyldiallyl ammonium homopolymers or copolymers, such as copolymers with acrylamide.

It is believed that virtually any water soluble polyamine may be used. As used herein, the term polyamine includes any water-soluble product having the following structure:

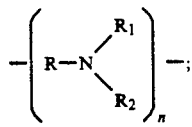

wherein $R_1$ and $R_2$, which may be the same or different, were selected from the group consisting of $C_1$-$C_8$ straight or branched alkyl, substituted $C_1$-$C_8$ straight or branched alkyl and hydrogen and wherein R is selected from the group consisting of $C_1$-$C_8$ straight or branched alkyl and substituted $C_1$-$C_8$ straight or branched alkyl. Preferably, the molecular weight should range from about 500 to about 50,000, as determined by conventional techniques such as gel permeation chromatography. Polymers having molecular weights ranging from about 10,000-150,000 are more preferred.

Any water soluble di $C_1$-$C_8$ alkyldiallyl ammonium polymer can be used. The preferred dialkyldiallyl ammonium polymers are polydimethyl diallyl ammonium chloride (polyDMDAAC), polydiethyldiallyl ammonium chloride (polyDEDAAC), polydimethyl diallyl ammonium bromide (polyDMDAAB), polydiethyl diallyl ammonium bromide (polyDEDAAB), and copolymers of a dialkyldiallyl monomer with acrylamide.

The most preferred polymers are polyDMDAAC's having molecular weights in excess of about 1,000,000. The molecular weight of the dialkyldiallyl ammonium polymer should be in excess of about 100,000, preferably in excess of 500,000 and most preferably in excess of about 1,000,000, as determined by conventional techniques.

As indicated above, the choice between the use of an anionic polymer and a cationic polymer is made based upon the sulfur content of the fuel (e.g., coal) being burned. For high sulfur fuels, i.e., fuels containing in excess of about 3 weight % sulfur, cationic polymers are preferred because it is believed that the cationic radicals preferentially bind the sulfur-containing gases such as $SO_2$ and $SO_3$ present in the gas stream being treated. This is believed to induce agglomeration and enhance porosity increase.

The instant polymers are preferably applied as part of an aqueous solution which also contains a nitrate. The solution is then preferably added as a fine mist to flue gas so that fly ash contacts an effective amount of the polymer/nitrate solution. The polymer/nitrate solution is preferably sprayed into the combustion gas stream where the fly ash is entrained, thereby contacting and treating the fly ash. The temperature of the flue gas should not exceed about 600° F., because the polymer may decompose.

Minimally, at least about 0.1%, by weight of the total composition, should be polymer (active basis). Preferably the polymer weight percent should range from about 0.1 to about 10%, most preferably from about 0.1 to about 3%, by weight.

Component (b) of the instant compositions is a nitrate. While any nitrate can be used as component b) nitrates of $NH_4$, Na, Li, Ca, Mg and Fe are preferred. Sodium nitrate and ammonium nitrate are especially preferred. Combinations of nitrates can also be used. Sodium nitrate is commercially available from BASF Wyandotte, and ammonium nitrate is commercially available from Ireco or El Dorado Chemicals. At least about 1.0%, based on total composition weight, of the instant composition should be a nitrate, preferably about 1.0 to about 75%, by weight. The balance of the instant compositions is water.

As indicated above, combinations of nitrates can be used. Preferred combinations comprise: i) ammonium nitrate and ii) sodium nitrate, wherein the i:ii weight ratio ranges from about 10:1 to about 1:10.

The instant compositions comprise: a) at least about 0.1%, by weight of the total composition, of at least one anionic or cationic polymer, on an active basis; b) at least about 1.0%, by weight of the total composition, of at least one nitrate; and c) the balance water.

Preferably, the instant compositions comprise a) from about 0.1% to about 10%, by weight of the total composition, of at least one anionic or cationic polymer, on an active basis; b) from about 1.0 to about 75%, based on total composition weight, of at least one nitrate; and c) the balance water.

Most preferably, the instant compositions comprise from about 0.1 to about 3.0%, by weight of the total composition of a) from about 5.0 to about 50%, by weight of the total composition, of b), with the balance being water.

It is critical to utilize both a polymer and a nitrate in the instant compositions and methods, within the specified weight ratios.

Other additives commonly used to treat flue gas streams may be used with the instant polymer/nitrate compositions. Examples include, but are not limited to, hydrochloric acid, ammonium sulfate, ammonia, sulfonic acid, ammonium persulfate, ammonium chloride and diethanol amine.

While the instant invention may be used to treat fly ash produced from the combustion of any fuel, including but not limited to hydrocarbon liquids, trash, landfill, hard or soft coal, and lignite, the inventor has found the instant invention to be particularly useful in the treatment of fly ash produced from the combustion of lignite or coal.

An effective amount of one of the instant compositions should be fed to the gas stream being treated. As used herein, the term "effective amount" refers to that amount of the instant compositions necessary to increase the porosity of the fly ash being treated in a given system to the desired level. The actual dosage required, in terms of ppm of the instant compositions/ppm fly ash, varies depending on the parameters defining the fly ash and the gas stream in which it is entrained. Variables to be considered include, but are not limited to, the fly ash concentration, the linear velocity of the gas stream, the type of fuel combusted, the temperature of the fly ash-laden stream, the type and design of the bag house and discharge limitations. Generally, however, the instant compositions must be fed at a dosage sufficient to provide at least about 1 part of active polymer per about 200,000 parts of fly ash (weight basis), more preferably about 1 part to about 100 parts polymer per 200,000 parts of fly ash.

Also, the individual components of the instant compositions can be fed separately to the gas stream being treated. The instant compositions can be used to treat gas streams generated from the combustion of hydrocarbon fuels, coal, lignite or virtually any type of fuel that produces fly ash of low resistivity. However, the instant compositions have been found to be especially effective relative to the treatment of gas streams generated by the combustion of lignite or coal.

EXAMPLES

The following examples further demonstrate the instant invention. These examples should not, however, be construed as limiting the instant inventions in any way.

EXAMPLES 1-7

Two different polymer/nitrate formulations, identified below as formulation A and B, were applied to fly ash samples obtained from burning various types of coal and lignite materials. Formulation A contained 0.8 weight % (active basis) of an acrylamide/2-acrylamido-2-methylpropyl sulfonic acid polymer having a molecular weight of greater than one million, wherein the AM/AMPSA weight ratio was 49/51 (such polymers are commercially available from Calgon Corporation, Pittsburgh, Pa.), and 50% by weight of ammonium nitrate, with the balance being water. Formulation B contained the same polymer and polymer concentration as in A but contained 25% by weight of ammonium nitrate and 25% by weight of sodium nitrate in water.

These formulations were applied to ash from seven (i.e., Examples 1 to 7) different industrial and power generating operations. 200 grams of sieved (through 200 mesh screen) ash was impregnated separately with dilute solutions of the formulation to give 5% by weight of each formulation in the dried ash. The final consistency of the impregnated, undried ash was kept paste like. A blank was also prepared by treating 200 gm ash with same volume of water as that of the dilute solution of the formulations. Both the treated and the blank samples were dried overnight at 200° C. The dried samples were ground and sieved until all passed through 200 mesh screen.

The densities of these materials were determined from their weights and volumes. The volume was measured by letting the weighed material drop into a graduated cylinder through a set speed Syntron vibrator. Since porosity of a powder is inversely proportional to its density, a decrease in density over the blank is indicative of increased porosity while an increase in density means a decreased porosity. The density data are presented below.

| Ex. No. | Sample/Source | Density, g/cc A-Blank/Treated | B-Blank/Treated |
|---|---|---|---|
| 1 | Eastern Coal, Utility | 0.89/0.81 | 0.89/0.86 |
| 2 | Eastern Coal, Utility | 0.69/0.70 | 0.69/0.71 |
| 3 | Eastern Coal, Utility | 1.08/0.84 | 1.08/1.05 |
| 4 | Eastern Coal, Industrial | 0.63/0.63 | 0.63/0.60 |
| 5 | Eastern Coal, Utility | 1.05/0.92 | 1.05/0.94 |
| 6 | Lignite, Utility | 0.96/0.75 | 0.96/0.60 |
| 7 | Eastern Coal, Utility | 0.66/0.43 | 0.66/0.46 |

These examples show that the densities of the treated ash, except in example two, were lower than their corresponding blank or untreated samples. A decrease in density is indicative of increased porosity of the treated ash.

What is claimed is:

1. A method for increasing the porosity of fly ash prior to treatment of the fly ash in a bag house comprising adding to the fly ash an effective amount of a composition comprising: a) at least about 0.1%, based on the total weight of said composition, of at least one anionic or cationic polymer; b) at least about 1.0%, based on the total weight of said composition, of at least one nitrate; and c) the balance water, wherein said effective amount provides at least about 1 part of said polymer per about 200,000 parts fly ash.

2. The method of claim 1, wherein said fly ash is generated from a fuel having a sulfur content of less than about 3.0 weight % and wherein an anionic polymer is used.

3. The method of claim 2, wherein said polymer is an acrylamide/2-acrylamido-2-methylpropyl sulfonic acid polymer having a molecular weight in excess of about 1,000,000.

4. The method of claim 1, wherein said nitrate is ammonium nitrate.

5. The method of claim 2, wherein said nitrate is ammonium nitrate.

6. The method of claim 3, wherein said nitrate is ammonium nitrate.

7. The method of claim 1, wherein b) comprises i) ammonium nitrate and ii) sodium nitrate, and wherein the weight ratio of i:ii ranges from about 10:1 to about 1:10.

* * * * *